Sept. 20, 1955 N. F. MARTIN ET AL 2,718,399

TURNTABLE AND TONE ARM CONTROL

Filed Feb. 25, 1949 3 Sheets-Sheet 1

INVENTORS.
Norman F. Martin
Robert H. Dreisbach
BY
Clarence J. Loftus
Atty.

Sept. 20, 1955 N. F. MARTIN ET AL 2,718,399

TURNTABLE AND TONE ARM CONTROL

Filed Feb. 25, 1949 3 Sheets-Sheet 2

INVENTORS.
Norman F. Martin
Robert H. Dreisbach
BY
Clarence J. Loftus
Atty.

Sept. 20, 1955 N. F. MARTIN ET AL 2,718,399

TURNTABLE AND TONE ARM CONTROL

Filed Feb. 25, 1949 3 Sheets-Sheet 3

INVENTORS.
Norman F. Martin
Robert H. Dreisbach
BY
Clarence J. Loftus
Atty.

United States Patent Office 2,718,399

Patented Sept. 20, 1955

2,718,399

TURNTABLE AND TONE ARM CONTROL

Norman F. Martin and Robert H. Dreisbach, Fort Wayne, Ind., assignors to The Magnavox Company, Fort Wayne, Ind., a corporation of Delaware Application February 25, 1949, Serial No. 78,356

9 Claims. (Cl. 274—9)

The present invention relates to electric phonographs, and more particularly to a multi-speed electric phonograph having a single pickup arm and single cartridge adapted for reproducing phonograph records requiring different speeds of turntable revolution, different stylus forces, and having grooves requiring styli of different characteristics.

The so-called "standard" records require a turntable speed of 78 R. P. M. while the "microgroove" records are to be reproduced on a turntable having thirty-three and one-third revolutions per minute. In addition to the difference in the speed of operation of these records the grooves also are different; with the grooves of the "microgroove" records relatively small, thus requiring a stylus having a tip radius of the order of one one-thousandth of an inch, or about one-third the radius of the standard. In addition, the force to be exerted by the stylus on the "microgroove" type of record is of the order from five to seven grams as compared to nearly an ounce of force on the standard type.

Separate turntables and pickup arms are ordinarily employed to play these different records, even when the reproducers are arranged to use the same amplifiers. It is obviously desirable, however, to have a single turntable and tone arm reproducer which will reproduce both types of records, and it is accordingly the general aim of the present invention to provide a reproducer adapted to provide for the automatic selection of the proper stylus with a single individual cartridge, and to provide the required needle force for each of the types or records to be reproduced. In the present invention, these are automatically set by the operator in selecting the desired speed of turntable revolution. It is apparent that numerous factors must be taken into consideration in order to attempt to provide a relatively simple solution to an arrangement which will permit the reproduction of both types of phonograph records with the minimum care and manipulation on the part of the operator.

It, therefore, is an object of the present invention to provide an improved electric phonograph having a simple control for selecting the proper stylus and force to be exerted thereon by the pickup arm.

A still further object of the present invention is to provide in an electric phonograph a unitary control for selecting the proper speed of the turntable and the corresponding stylus.

Still another object of the present invention is to provide in an electric phonograph a unitary control for selecting speed, stylus and pickup arm force.

A still further object of the present invention is to provide an electric phonograph having a unitary control for selecting speed, stylus and producing simultaneously a change in the moment arm of the pickup arm.

Other and further objects of the present invention subsequently will become apparent by reference to the following description taken in conjunction with the accompanying drawings wherein.

Figures 1, 2, 4:
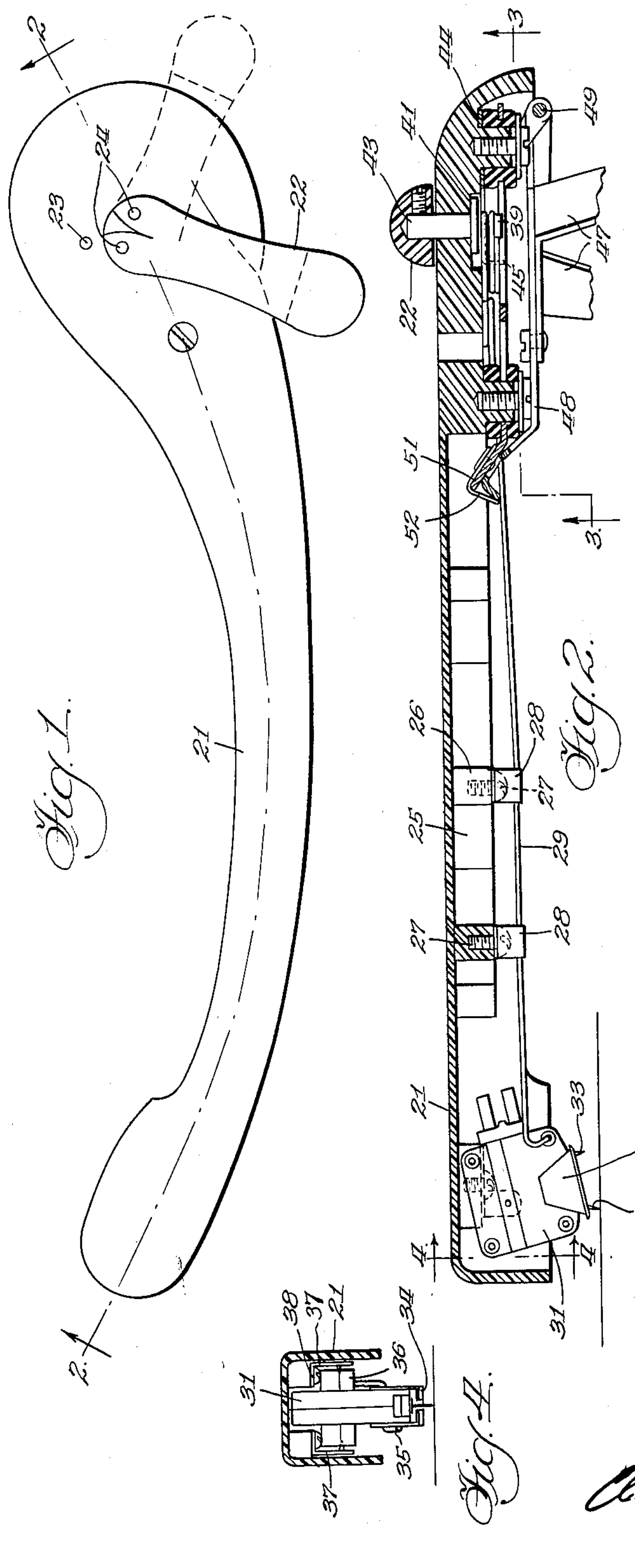
Fig. 1 is a plan view of a pickup arm constructed in accordance with the present invention.
Fig. 2 is a cross-sectional view through the center line of the arm of Fig. 1 as indicated by the line 2—2 thereof.
Fig. 4 is an end view as seen in the direction of the arrows along the line 4—4 of Fig. 2.
Figure 3:
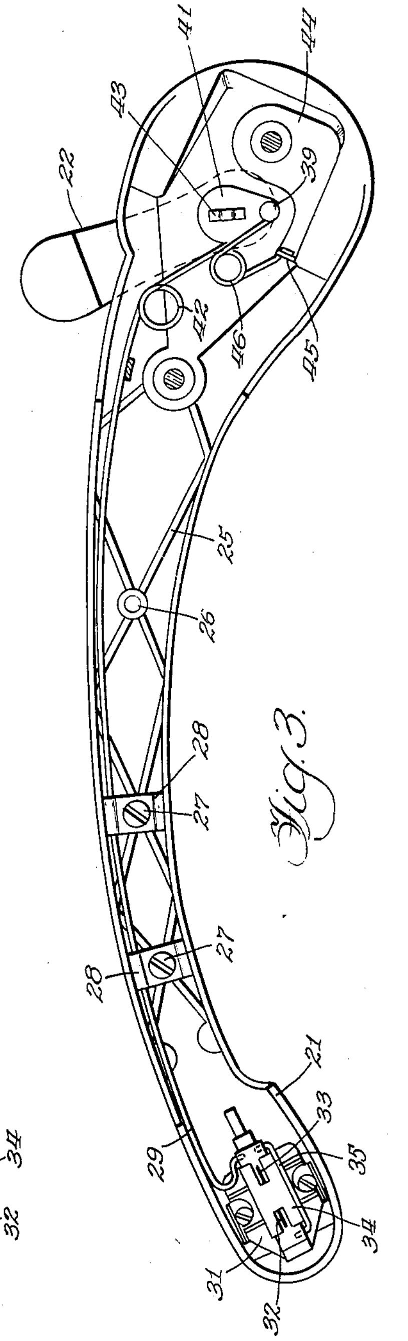
Fig. 3 is a bottom view of the pickup arm of Fig. 1 as seen from the stepped plane 3—3 of Fig. 2.

Referring more particularly to Figs. 1, 2, 3 and 4 there is shown a pickup arm constructed in accordance with the principles of the present invention. This pickup arm has a casing 21 formed of plastic which is molded or cast to the desired shape. A control knob or lever 22 is pivotally mounted on top of the arm 21 and, as indicated by the dotted lines in Fig. 1, the lever 22 is adapted to be moved to either of two positions so as to predetermine the operation for phonograph records of the conventional 78 R. P. M. type or of the newer 33⅓ R. P. M. type. As illustrated, the pivot of the arm 22 is substantially in alignment with the vertical pivot of the pickup arm 21, but it may be located at other points on the arm.

The pickup arm 21 carries an indicia 23 for cooperation with indicia 24 located on the control knob or lever 22. The pickup arm 21 may be molded or cast, and carries, at its outer end, the pickup cartridge 31 which is provided with laterally extending projections 36 which have recesses therein for receiving the pivots formed in a pair of pivotal mounting clips 37. Two similar mounting portions 37 are provided each of which is retained in position by a self-tapping screw 38 which extends into a molded projection within the pickup arm 21. By means of the pivotal connection thus provided the cartridge 31 may be moved from its solid line position shown in Fig. 2 to a position where the other stylus 33 is in contact with the groove of a phonograph record. To this end the pickup arm is provided with an operating wire 29 extending across reinforcing struts or ribs 25 and hollow posts 26. The posts 26 are adapted to receive self-tapping screws 27 for holding in position suitable clips 28, which guide the wire 29 for controlling the position of the pickup cartridge 31. This wire is actuated by the lever 22 and is arranged to be shifted longitudinally as the lever 22 is pivoted so as to bring into contact with a phonograph record either one of a plurality of styli 32 and 33. The styli 32 and 33 project through a guard 34 which serves to protect the styli against injury in the event that the pickup arm is dropped upon a phonograph record. The guard 34 fits over the lower portion of the cartridge 31 and a wire retaining clip 35 is soldered to the guard 34 with its opposite free ends arranged to snap into the tubular rivets in the cartridge to hold the guard in place.

One end of the wire 29 is suitably bent or shaped so that the extremity thereof fits one of these rivets, so that the rivet acts as a pivoted joint whereby longitudinal movement of the wire may tilt the cartridge between its two positions.

The other end of the wire 29 is in the form of a loop which extends about a post 39 mounted on a cam plate 41. A short distance from the loop 39 the wire 29 is provided with an intermediate loop 42 so that the wire 29 exerts a certain bias or traction in either direction dependent upon the position in which the lever 22 is located. The lever 22 is connected to a pivot post 43 which has a flattened or generally rectangular portion extending through the cam plate 41.

Mounted within the arm 21 is a plate 44 which has a downwardly extending projection 45; an overcenter spring 46 has one of its looped ends positioned about the stud 39 of the cam plate 41. The other end of the overcenter spring 46 is anchored to the downwardly extending projection 45 of the plate 44. The overcenter spring 46 operates to bias the arm 22 to either of its two positions so that the arm cannot occupy an intermediate position.

In accordance with common practice the pickup arm 21 is pivoted about a vertical axis by a pivot (not shown) which in turn supports a horizontal pivot pin on which the bifurcated pickup arm support 47 illustrated in Fig. 2 is carried. This, therefore, provides for universal pivotal movement of the arm 21. The bifurcated portion 47 is connected to a generally horizontal plate 48 which has a horizontal pivotal connection 49 adjacent the rear of the pickup arm 21. The pivotal connection 49 is connected to another horizontal plate 51 which at its forward extremity carries a latching spring 52 for engaging the forward extremity of the plate 48 so the pickup arm may be lifted sufficiently to provide access to the underside of the arm in the event that adjustments, replacements or repairs might be needed. This construction does not form a part of the present invention. For the sake of clarity in Figures 2 and 3 the electrical connections to the cartridge 31 have not been shown but they comprise a conductor which may be retained by the opposite portions of the clips 28 and which extends to the rear of the pickup arm 22 in the proximity of its vertical pivot.

Figures 5, 6, 7, 8, 9:
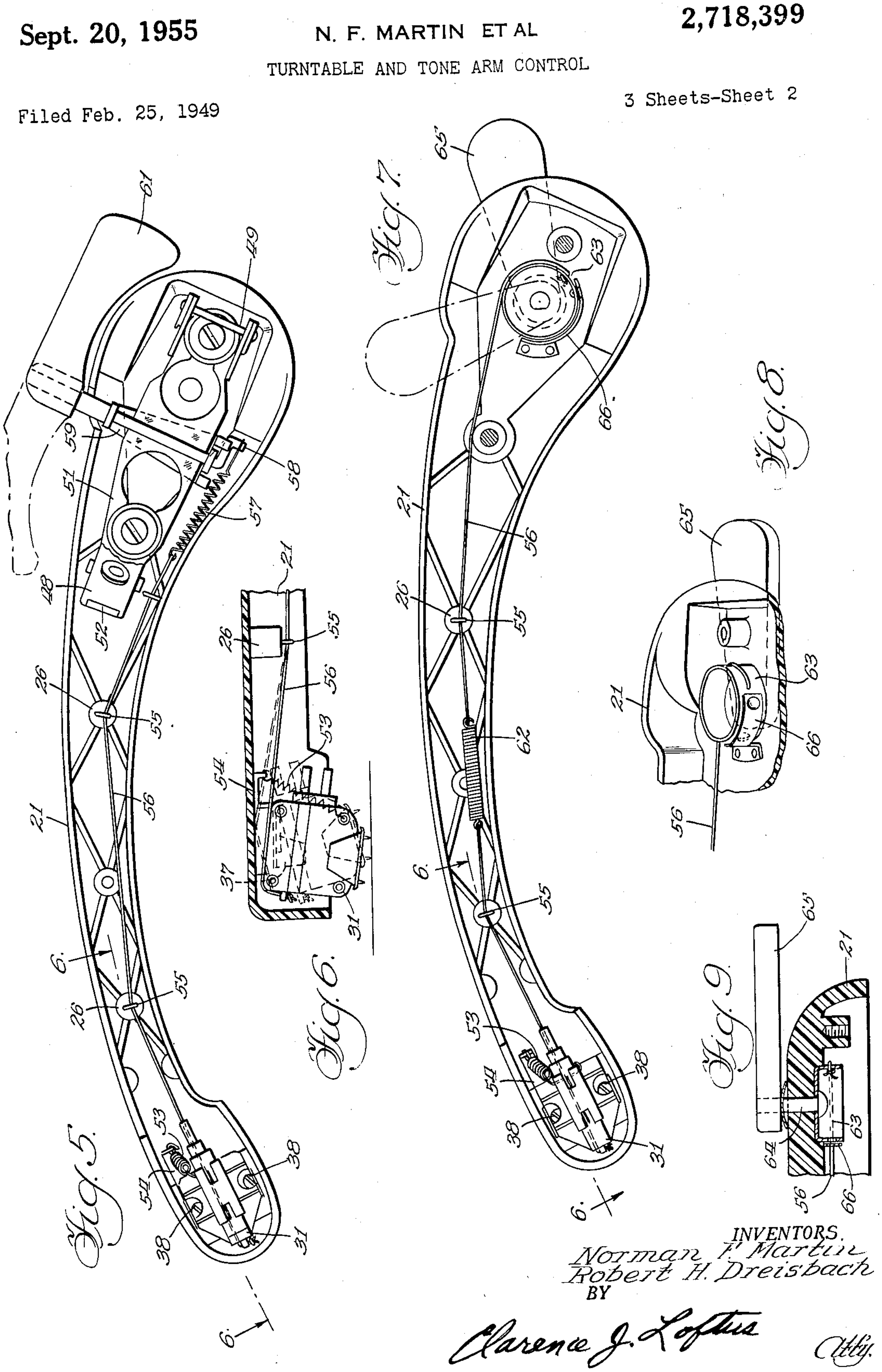
Fig. 5 is a bottom view of an arm of alternative construction.
Fig. 6 is a detailed view showing a cartridge as seen along the line 6—6 of Fig. 5.
Fig. 7 is a bottom view of a phonograph pickup arm of another alternative construction.
Fig. 8 is a detailed view in perspective showing the portion of the arm illustrated in Fig. 7.
Fig. 9 is a cross-sectional view showing the same details as illustrated in Fig. 8.

Figs. 5 and 6 show another embodiment or variation of the pickup arm shown in Figs. 1–4. For the sake of simplicity in explanation and disclosure those elements which are substantially identical to the elements shown in Figs. 1–4 have been given the same reference characters in Figs. 5 and 6. The pickup cartridge 31 is again pivotally mounted in a manner similar to the embodiment in the previous figures, but is biased toward a predetermined position by a spring 53 connected between one of the tubular rivets near the rear and bottom of the cartridge and a bracket 54 held in position by one of the fastening screws 38 which hold the pivotal support bracket 37. Several of the posts 26 formed on the underside of the arm casing 21 are provided with screw-eyes or eyelets 55. A cord or flexible wire passes through these eyelets and is fastened to the nut of the cartridge 31 so that when tension is applied to the cord or wire 56 the cartridge may be moved from the dotted line position shown in Fig. 6 to the solid line position.

The other extremity of the cord or flexible wire 56 is connected to a spring 57 which is connected to a crank 58. The crank 58 is journaled in a suitable bracket 59 supported from the underside of the pickup arm casing 21. A control lever 61 is connected to the pivotal shaft portion of the crank 58. The control lever 61 is arranged to be positioned in either of two positions and has sufficient mass so as to change the effective center of mass of the pickup arm 21 or, in other words, to vary the force exerted through the pickup arm 21 on the stylus which is in engagement with a phonograph record. It will be noted that the axis of rotation of the control lever 61 is in the proximity of the vertical and horizontal pivotal axes of the pickup arm 21.

Opposite sides of the control lever 61 may be provided with proper indicia so as to expose to view the indicia indicating the speed of the turntable and indicating the type of phonograph record which is to be played. The spring 57 has tension applied thereto when the control lever 61 is in solid line position shown in Fig. 5 so as to overcome the effect of the biasing spring 53 on the cartridge 31. The spring 57 also serves to retain in position the control lever 61.

Still another variation or embodiment is illustrated in Figs. 7, 8 and 9 wherein again similar components have been given similar reference characters corresponding to those in the previous figures. In the arrangement illustrated in Fig. 7 the cartridge 31 is again biased to a predetermined position by the spring 53 which is connected to the cartridge and to the bracket 54. The flexible cord or cable 56 has a spring 62 connected at an intermediate point as between two of the eyelets, or screw-eyes 55. One end of the spring or cable 56 is connected to a drum 63 carried by a shaft 64 which at its other end is provided with a control lever 65. The control lever 65 is arranged to be positioned in either of two positions as illustrated by the solid and dotted line representations of Fig. 7. The drum 63 is provided with a plurality of apertures which are engaged by a detent 66 suitably mounted on the underside of the casing 21. The change in position of the control lever 65 again serves to change the balance or force of the pickup arm and provides for a change in the position of the pickup cartridge 31 so as to bring a different stylus into playing position. Therefore, it becomes apparent that in the various embodiments thus far disclosed a single control knob or lever serves to bring into proper playing position a corresponding stylus and operates to change a force exerted upon the stylus. While the several embodiments have shown the force change on the stylus to have been accomplished by changing the effective weight or moment arm of the pickup arm by a shifting of the mass of the control lever, it of course will be appreciated that the same effect could be accomplished by varying a spring biased arrangement in the proximity of the horizontal pivot of the pickup arm 21.

Figure 10:
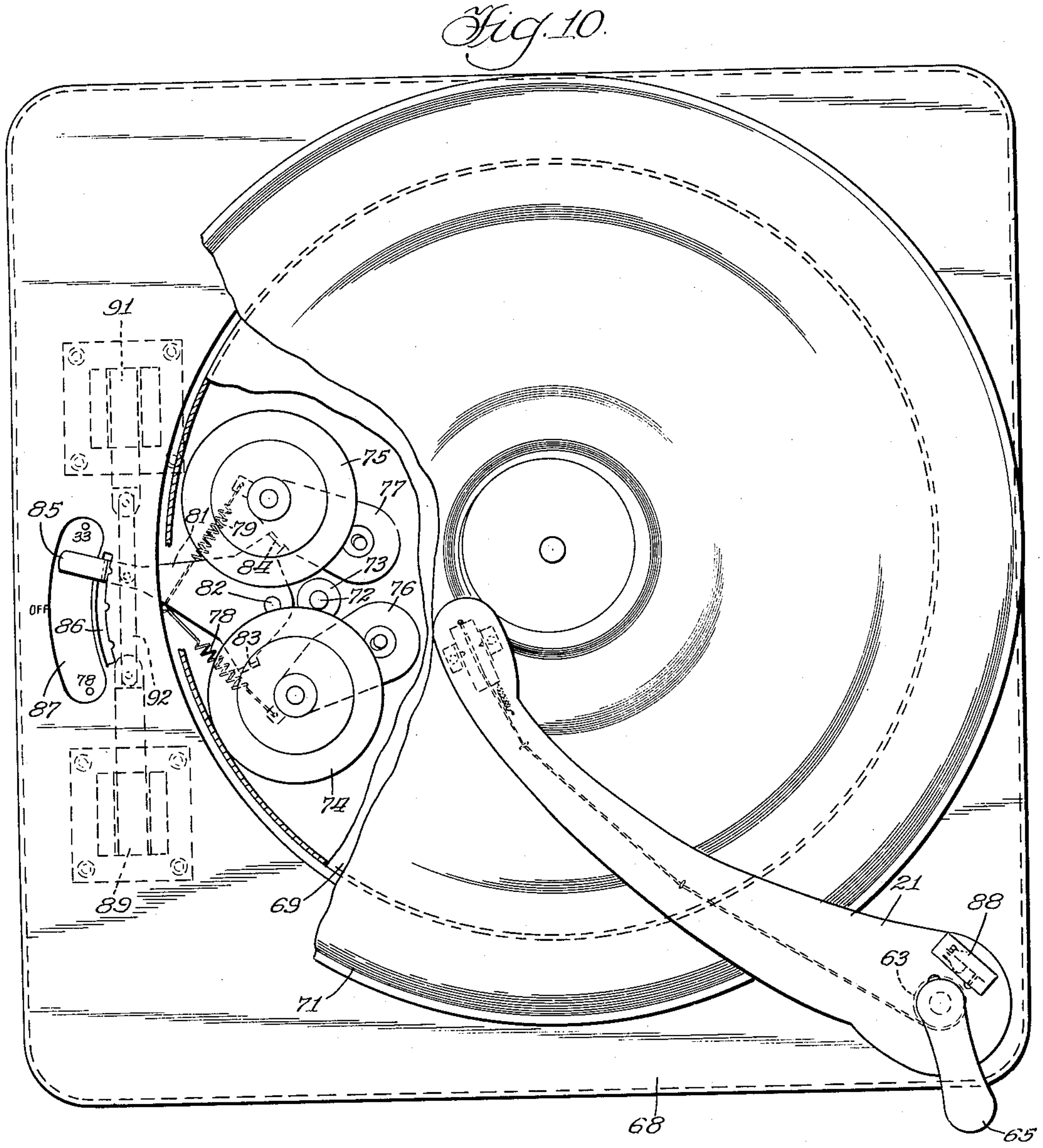
Fig. 10 is a plan view of a turntable having an arm of the construction illustrated in Fig. 7 and disclosing in broken away portions the arrangement provided for two speed operation of the turntable.

The actuation of the control knob or lever in any of the embodiments also is arranged to control the speed of operation of the turntable. One manner in which this may be accomplished is illustrated in Fig. 10 which shows an assembly employing a pickup arm of the construction illustrated in Figs. 7, 8 and 9. A suitable mounting board 68 is provided for a turntable 69 which is shown as carrying a large phonograph record 71. Since the present invention is applicable to many types of automatic record changers no particular mechanism has been illustrated in Fig. 10 for supporting a stack of records which are to be dropped one at a time upon the turntable 69.

The turntable 69 is arranged to be driven by a motor not shown but which has a driving shaft provided with one portion of a small diameter 72 and a larger diameter portion 73. An idler wheel 74 is arranged to be moved into contact with the smaller diameter portion 72 and the inner rim of the turntable 69. Another idler wheel 75 is arranged to be moved into contact with the larger diameter shaft portion 73 and the inner rim of the turntable 69. The idler wheels 74 and 75 are supported by pivoted levers 76 and 77 which are spring biased by springs 78 and 79 secured to a suitable point on the underside of the mounting board or frame 68. A lever 81 is pivotally mounted at 82 so that two upright portions 83 and 84 may be selectively moved into engagement with the levers 76 and 77. A pivoted lever 81 has a narrow end portion 85 which extends up through an arcuate slot 86 in the support or mounting board 68. Suitable indicia are provided adjacent the arcuate slot 86 to visibly indicate the operating condition of the idler wheels 74 and 75. These indicia may be carried by a suitable plate 87. When the indicator portion 85 of the lever 81 is in the position shown in Fig. 10 the upright portion 84 of the lever 81 is in engagement with the pivoted lever 77 which thereby moves the idler wheel 75 out of engagement with both the rim of the turntable and the large shaft portion 73 of the driving motor. When the indicator 85 is at the other end of the slot 86 the idler wheel 75 is permitted to engage the inner rim of the turntable 69 and the motor shaft portion 73. At the same time the upright portion 83 of the lever 81 engages the pivoted lever 76, thereby moving the idler wheel 74 out of engagement with the turntable 69 and the motor shaft portion 72. During the time that the phonograph is not in operation the indicator 85 will be located at the "Off" position at about the center of the arcuate slot 86. When the lever 81 is in this position both the upright portions 83 and 84 of the lever are in engagement with the pivoted levers 77 and 76 which are then so positioned that the idler wheels 74 and 75 are entirely free. By arranging the idler wheels 74 and 75 so as to be entirely out of engagement with any other objects, these wheels which generally are formed so as to have rubber driving rims, are prevented from being deformed by having one portion thereof in engagement with some object for prolonged periods of time.

The pivoted lever arm 65 moves the drum 63 of Fig. 8 so as to actuate an electric switch 88. The electric switch 88 is arranged to control the energization of two solenoids 89 and 91 by means of the circuit illustrated in Fig. 11. The cores of the solenoids are connected together by a bar 92 which is connected at an intermediate point to the lever 81.

Figure 11:
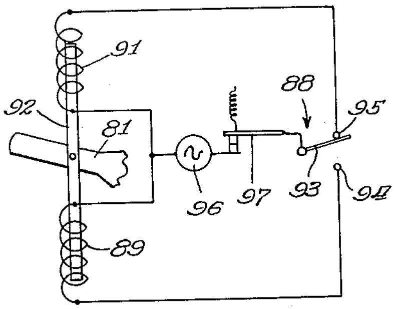
Fig. 11 is an electric circuit diagram employed in conjunction with the turntable illustrated in Fig. 10.

As is apparent from Fig. 11 the switch 88 has a movable contact 93 which is arranged to engage contacts 94 and 95 dependent upon the condition or position of the control lever 65. The stationary contacts 94 and 95 of the electric switch 88 are respectively connected to one terminal of each of the solenoids 89 and 91. The remaining terminals of the solenoids 89 and 91 are connected to one side of a suitable source of current 96. The other side of the source of current 96 is connected through an electric switch 97 to the movable contact 93 of the switch 88. The switch 97 is actuated by a suitable mechanism not shown but quite common in the art for bringing about de-energization of the electric driving motor for the phonograph. This switch therefore may also have contacts so arranged as to control the energization of the solenoids 89 and 91 whereupon when the last phonograph record has been reproduced the switch 97 is open. When this occurs the lever 81 is moved to the "Off" or "Neutral" position. This can be accomplished by providing sufficient bias in the springs 78 and 79 so that the pivoted levers 76 and 77 bearing against the upright portions 83 and 84 of the lever 91 move it to neutral position. Of course, if it is desired to use smaller springs the lever 81 could be moved to neutral position by momentarily energizing both solenoids through a suitable momentary make and break contact arrangement as will be apparent to anyone skilled in the art.

While for the purpose of illustrating and describing the present invention certain preferred embodiments have been illustrated it is to be understood that the invention is not to be limited thereby, since such variations are contemplated as may be commensurate with the spirit and scope of these accompanying claims.

What we desire to protect by United States Letters Patent is claimed as follows:

1. In a phonograph, the combination comprising a turntable, a pickup arm pivoted at one end for vertical and horizontal movement with respect to said turntable, a pickup cartridge movably mounted at the other end of said arm and including a pair of styli disposed for alternate playing contact with a record, a manually operable control knob on said one end, means operatively associated with said pickup arm and said knob for mounting said knob on said one end for movement of its mass longitudinally of said pickup arm upon manual operation of said knob whereby movement of said knob toward one end or the other of said pickup arm effects a shift of the center of gravity of said pickup arm with respect to the pivotal axis thereof and changes the effective stylus pressure, and a mechanical linkage comprising a wire operatively connected with said cartridge and said knob for moving said cartridge upon said manual operation of said knob simultaneously to shift one of said styli into contact with a record and to adjust the stylus pressure.

2. In an electric phonograph, a turntable, variable speed driving means connected to said turntable, a pickup arm pivoted at one end for vertical movement and provided with a cartridge having two styli at the other end thereof, means pivotally mounting said cartridge on said pickup arm for tilting movement of one stylus or the other into playing position, a manually operable control knob on said one end, means operatively associated with said pickup arm and said knob for mounting said knob on said one end for movement of its mass longitudinally of said pickup arm upon manual operation of said knob for changing the force of the arm and the stylus on a phonograph record, means interconnecting said styli with said knob and manually operable thereby for tilting said cartridge and thereby moving a selected stylus into playing position, and means operatively associated with said driving means and said knob and responsive to said manual operation of said knob for selecting the speed of said turntable.

3. In an electric phonograph, a turntable, variable speed driving means connected to said turntable, a pickup arm pivoted at one end for vertical movement and provided with a cartridge having two styli at the other end thereof, means pivotally mounting said cartridge on said pickup arm for tilting movement of one stylus or the other into playing position, a manually operable control lever on said one end, rotatable means operatively associated with said pickup arm and said lever for mounting said lever on said one end for movement of its mass to two different positions longitudinally of said pickup arm upon manual operation of said lever for changing the force of the arm and the stylus on a phonograph record, means interconnecting said styli with said lever and manually operable thereby for tilting said cartridge and thereby moving a selected stylus into playing position, and means operatively associated with said driving means and said lever and responsive to said manual operation of said lever for selecting the speed of said turntable.

4. In a phonograph, a combination comprising a turntable having alternative driving means shiftable between a high speed driving position and a low speed driving position, a pickup arm pivoted at one end for vertical movement and including a pickup cartridge mounted at the other end thereof and having alternative stylus tips, means pivotally mounting said cartridge on said pickup arm for tilting movement of one stylus or the other into playing position, a manually operable control knob on said one end, means operatively associated with said pickup arm and said knob for mounting said knob on said one end for movement of its mass longitudinally of said pickup arm upon manual operation of said knob for changing the force of the arm and a stylus tip on a phonograph record, means interconnecting said pickup cartridge with said knob and manually operable thereby for tilting said cartridge and thereby moving a selected stylus tip into playing position, and means operatively associated with said driving means and said knob and responsive to said manual operation of said knob for shifting the driving means from one driving position to the other.

5. In an electric phonograph, a turntable, variable speed driving means connected to said turntable, electric means operatively associated with said driving means for selecting a desired operating speed, a pickup arm pivoted at one end for vertical movement and provided with a cartridge having two styli at the other end thereof, means pivotally mounting said cartridge on said pickup arm for tilting movement of one stylus or the other into playing position, a manually operable control knob on said one end, means operatively associated with said pickup arm and said knob for mounting said knob on said one end for movement of its mass longitudinally of said pickup arm upon manual operation of said knob for changing the force of the arm and the stylus on a phonograph record, means interconnecting said styli with said knob and manually operable thereby for tilting said cartridge and thereby moving a selected stylus into playing position, and an electric switch operatively associated with said electrical selecting means and said knob and responsive to manual operation of said knob for selecting a desired operating speed.

6. In an electric phonograph, a turntable, variable speed driving means connected to said turntable, a pickup arm pivoted at one end for vertical movement and provided with a cartridge having two styli at the other end thereof, means pivotally mounting said cartridge on said pickup arm for tilting movement of one stylus or the other into playing position, a manually operable control knob on said one end, means operatively associated with said pickup arm and said knob for mounting said knob on said one end for movement of its mass longitudinally of said pickup arm upon manual operation of said knob for changing the force of the arm and the stylus on a phonograph record, and means interconnecting said styli with said knob and manually operable thereby for tilting said cartridge and thereby moving a selected stylus into playing position.

7. In a phonograph, the combination comprising a turntable, a pickup arm pivoted at one end for vertical and horizontal movement with respect to said turntable, a pickup cartridge mounted on the other end of said arm and including a pair of styli disposed for alternate playing contact with a record, means pivotally mounting said cartridge on said pickup arm for tilting movement of one stylus or the other into playing position, a manually operable control knob on said one end of said pickup arm, means for mounting said control knob on said one end of said pickup arm in vertical alignment with the axis of vertical movement of said pickup arm for movement of said knob toward one end or the other of said pickup arm upon manual operation of said control knob for effecting a shift of the center of gravity of said pickup arm with respect to the pivotal axis thereof and changing the effective stylus pressure, and a mechanical linkage interconnecting said cartridge and said knob and manually operable thereby for tilting said cartridge and thereby moving a selected one of said styli into position for contact with a record.

8. In a phonograph, the combination comprising a turntable, a pickup arm pivoted at one end for vertical and horizontal movement with respect to said turntable, a pickup cartridge at the other end of said arm and including a pair of styli angularly displaced with respect to one another for alternate playing contact with a record, means pivotally mounting said cartridge on said pickup arm for tilting movement of one stylus or the other into playing position, a manually operable lever rotatably mounted adjacent one of its ends on said one end of said pickup arm whereby manual operation of said lever toward one end or the other of said pickup arm effects a shift of the center of gravity of said pickup arm with respect to the pivotal axis thereof and changes the effective stylus pressure, and a mechanical linkage comprising a spring wire interconnecting said cartridge and said lever and manually operable thereby for tilting said cartridge and thereby moving a selected one of said styli into position for playing contact with a record.

9. In a phonograph, a combination comprising a turntable, a pickup arm pivoted at one end for vertical and horizontal movement with respect to said turntable, a pickup cartridge mounted at the other end of said pickup arm and including a pair of styli angularly displaced with respect to one another for alternate playing contact with a record, means pivotally mounting said cartridge on said pickup arm for tilting movement of one stylus or the other into playing position, a manually operable lever movably mounted adjacent one of its ends on said one end of said pickup arm in vertical alignment with the axis of vertical movement of said pickup arm whereby manual operation of said lever toward one side or the other of said axis effects a shift of the center of gravity of said pickup arm with respect to the pivotal axis thereof and changes the effective stylus pressure, and a mechanical linkage interconnecting said cartridge and said lever and manually operable thereby for tilting said cartridge and thereby moving a selected one of said styli into position for playing contact with a record.

References Cited in the file of this patent

UNITED STATES PATENTS

| | | |
|---|---|---|
| 842,897 | Macdonald | Feb. 5, 1907 |
| 937,459 | Murdock | Oct. 19, 1909 |
| 1,394,804 | Bender | Oct. 25, 1921 |
| 1,992,893 | Thomas | Feb. 26, 1935 |
| 2,087,135 | Wielage | July 13, 1937 |
| 2,113,401 | Goldsmith | Apr. 5, 1938 |
| 2,145,743 | Welch | Jan. 31, 1939 |
| 2,266,781 | Lucarelle | Dec. 23, 1941 |
| 2,320,572 | Dann | June 1, 1943 |
| 2,326,625 | DiToro | Aug. 10, 1943 |
| 2,526,188 | Andres | Oct. 17, 1950 |
| 2,568,671 | Vistain | Sept. 18, 1951 |